Nov. 27, 1923.
E. H. DICKENSHEET
TIRE CONSTRUCTION
Filed Jan. 5, 1921
1,475,225
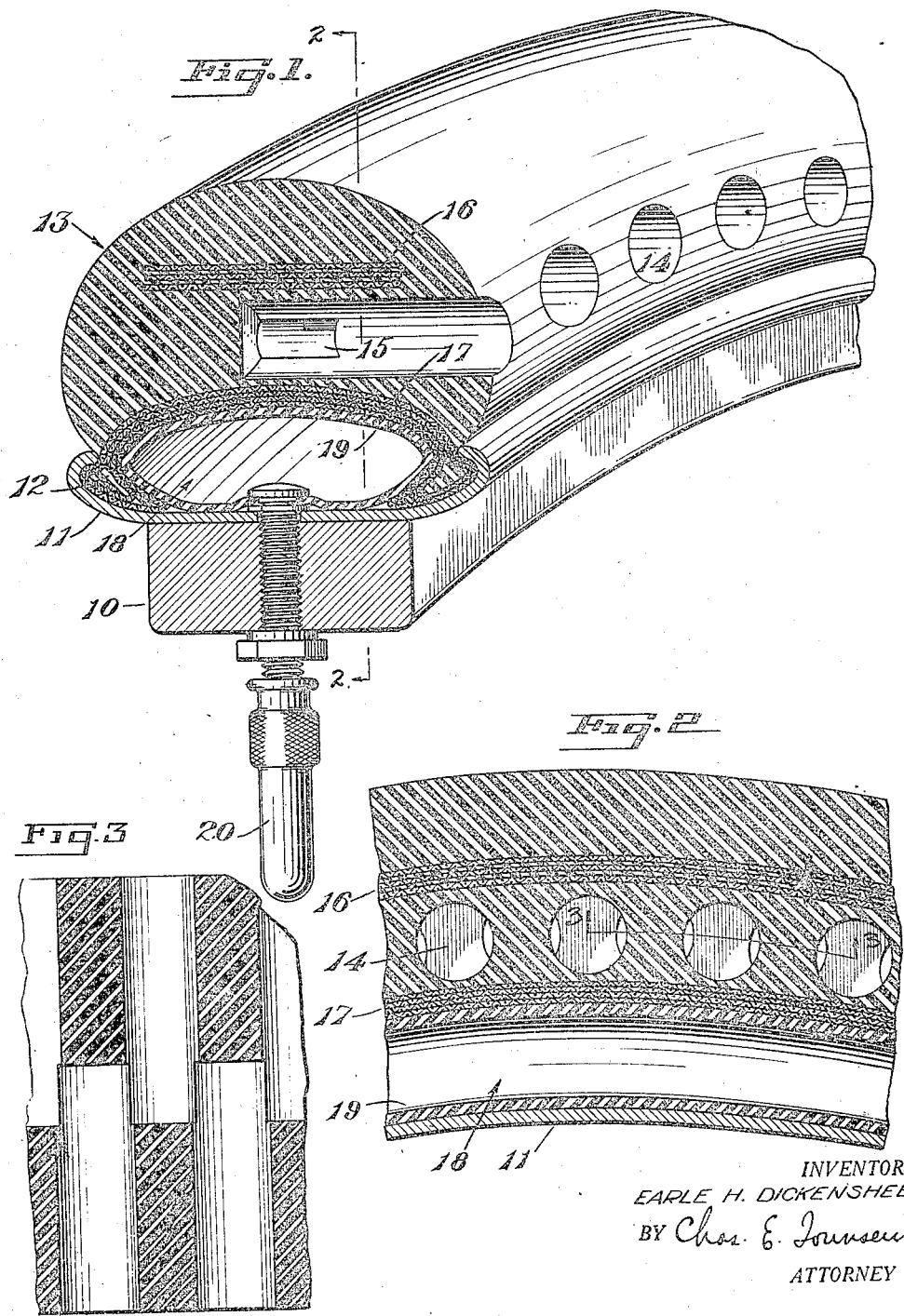
INVENTOR.
EARLE H. DICKENSHEET.
BY Chas. E. Townsend
ATTORNEY Patented Nov. 27, 1923.

1,475,225

UNITED STATES PATENT OFFICE.

EARLE H. DICKENSHEET, OF SAN FRANCISCO, CALIFORNIA, ASSIGNOR TO FAULTLESS PNEUMATIC TIRE COMPANY, OF SEATTLE, WASHINGTON, A CORPORATION OF WASHINGTON.

TIRE CONSTRUCTION.

Application filed January 5, 1921. Serial No. 435,133.

*To all whom it may concern:*

Be it known that I, EARLE H. DICKENSHEET, a citizen of the United States, residing at San Francisco, in the county of San Francisco and State of California, have invented new and useful Improvements in Tire Constructions, of which the following is a specification.

This invention relates to a vehicle tire, and particularly pertains to a pneumatic cushion tire.

It is the principal object of this invention to provide a vehicle tire with the desirable qualities of both a cushion and of a pneumatic tire, without the undesirable qualities of either.

The present invention contemplates the use of a cushion tire preferably formed to produce a maximum resiliency and carrying a pneumatic tube between its beads, whereby the tire may be clamped into position upon either the usual types of tire rims or upon a special rim designed for it, and may be afforded a desired pneumatic action.

The invention is illustrated by way of example in the accompanying drawings, in which—

Figure 1 is a fragmentary view in section and perspective illustrating the principles of the present invention.

Figure 2 is a view in longitudinal central section through the tire taken on line 2—2 of Fig. 1, further disclosing the details of construction.

Fig. 3 is a fragmentary view in plan section taken on line 3—3 of Fig. 2.

Referring more particularly to the drawings: 10 indicates a wheel felly around which is mounted the usual or specially designed rim 11. As shown in the drawings, this rim is inturned along its marginal edges to receive clincher beads 12, which form a part of a tire 13. It will be understood, however, that the design of the tire may be altered to correspond with straight sided tires seating between parallel flanges of a tire rim.

The general construction of the tire shown in the drawings is that disclosed in my copending application entitled "Tire and mold therefor", Serial Number 405,828, filed August 25, 1920.

In this tire the body of the structure is formed with a plurality of alternately disposed air passageways 14, which are arranged in staggered relation to each other and overlap and communicate with each other along their overlapping portions, thereby forming a continuous centrally circumferential passageway 15. A breaker strip is preferably embedded within the tread of the tire, as indicated at 16, and in the present case a fabric reinforcing structure 17 is provided. This structure is so formed as to make a shallow pneumatic tube channel 18 around the entire inner circumference of the tire, and within which a separate specially formed pneumatic tube 19 is positioned. On account of the great thickness of tire from the innermost points of the beads up the sides and over the top of the compressed air space, it is quite plain that there will be no punctures or blowouts, which is the prime reason that a separable tube is used in the present type of pneumatic tires. Now, since there can be no punctures or blowouts in my tire, I also provide for vulcanizing an inner tube to the inner part of space 19 and of which it becomes an integral part. The fabric strips 17, while embedded within the body of the tire, also form the clincher beads 12', and thereby afford the tire a well reinforced construction by which a clincher rim may hold it in its seated position.

A cavity or channel 18 extends completely around the circumference of the tire, and for that reason a pneumatic tube 19 may be readily placed in position between the parallel marginal edges of the channel, and when inflated through the valve structure 20, will act to force the tire beads 11 out into interlocking relation with the rim flanges, and at the same time afford an annular pneumatic cushion within the tire, to supplement the action of the specially formed body portion.

In the operation of the present invention, tube 19 is mounted in the channel 18 and thereafter the tire is positioned upon its rim. When this has been done, the tube may be inflated to any desired pressure. Minor road shock will be, of course, absorbed in the tread portion of the tire, and when excessive vibration takes place, the force will be imparted to the pneumatic tube, at the same time being partially dissipated due to the system of openings 14 and 15.

It will thus be seen that in the present instance a combined cushion and pneumatic tire is provided, having all of the desirable qualities of both the pneumatic and cushion tire, and furthermore that the structure here disclosed insures that the tire may be readily mounted in position upon the usual rim and easily detached when desired.

While I have shown the preferred form of my invention as now known to me, it will be understood that various changes might be made in the combination, construction and arrangement of parts by those skilled in the art, without departing from the spirit of the invention, as claimed.

Having thus described my invention, what I claim and desire to secure by Letters Patent is—

1. A tire comprising a body portion having an annular air chamber formed adjacent the inner circumference thereof, and laterally extending recesses formed in the body portion of the tire intermediate the air chamber and the tread, said recesses alternately extending from opposite sides of the tire in staggered relation to each other in a position to cause their inner ends to intersect and laterally overlap, thereby forming a passageway circumferentially through the body portion of the tire and establishing a direct communication between all of the recesses.

2. A tire comprising a body portion having an annular air chamber formed adjacent the inner circumference thereof, laterally extending recesses formed in the body portion, said recesses alternately extending from opposite sides of the tire in staggered relation to each other and in a position to cause their inner ends to intersect and laterally overlap, and laminated fabric reinforcing members embedded in the body portion to bridge the overlapping ends of the recesses.

3. A tire comprising a body portion having an annular air chamber adjacent the inner circumference thereof and of comparatively small cross section, said body portion being formed with laterally extending recesses interconnected by a passageway formed circumferentially of the tire establishing direct communication between all of the lateral passageways.

EARLE H. DICKEY SHEET.